United States Patent [19]

Sweet

[11] Patent Number: 4,865,920

[45] Date of Patent: Sep. 12, 1989

[54] HOT-MELT PRESSURE SENSITIVE ADHESIVE ARTICLE AND METHOD OF MAKING

[75] Inventor: Randall P. Sweet, Midland, Mich.

[73] Assignee: Dow Corning Corporation, Midland, Mich.

[21] Appl. No.: 246,604

[22] Filed: Sep. 20, 1988

[51] Int. Cl.$^4$ ............................................... B32B 9/04
[52] U.S. Cl. ........................... 428/447; 427/208.2; 427/208.4; 427/398.1; 428/522
[58] Field of Search ............... 427/208.2, 208.4, 398.1; 428/447, 522

[56] References Cited

U.S. PATENT DOCUMENTS

| | | | |
|---|---|---|---|
| 2,467,178 | 4/1949 | Zimmer et al. | 252/49.6 |
| 3,185,627 | 5/1965 | Kass | 167/90 |
| 3,929,704 | 12/1975 | Horning | 260/29.1 SB |
| 3,944,418 | 3/1976 | Sloan | 96/1 R |
| 4,331,651 | 5/1982 | Reul et al. | 424/19 |
| 4,581,281 | 4/1986 | Gerace | 428/215 |

FOREIGN PATENT DOCUMENTS

57102/82 12/1980 Japan.

*Primary Examiner*—Bernard Pianalto
*Attorney, Agent, or Firm*—Susan M. Cornwall

[57] ABSTRACT

A hot-melt silicone pressure sensitive adhesive composition comprising (i) a silicon resin, (ii) a silicone fluid, and (iii) 1 to 10 weight percent based on the total weight of said silicone resin and said silicone fluid, an ester having the formula:

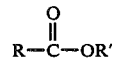

wherein R is a monovalent hydrocarbon radical having from 2 to 32 carbon atoms, and R' is a monovalent hydrocarbon radical having from 1 to 14 carbon atoms.

14 Claims, No Drawings

HOT-MELT PRESSURE SENSITIVE ADHESIVE ARTICLE AND METHOD OF MAKING

BACKGROUND OF THE INVENTION

The present invention relates to hot-melt pressure sensitive adhesive compositions, and, more specifically to silicone hot-melt pressure sensitive adhesive compositions and methods of using such compositions.

A pressure sensitive adhesive, generally, is a material which adheres to a surface with slight pressure and releases from the surface with negligible transfer of the material to the surface. Silicone pressure sensitive adhesives (SPSA's) that are known in the art are typically solvent-based adhesives; the solvents are employed primarily to reduce the SPSA's viscosity to a viscosity which is easily coated onto the substrate of choice, and the solvents are removed after coating. As with any solvent-based pressure sensitive adhesive (PSA), special precautions must be taken to contain and avoid environmental exposure of the solvents and avoid flammable and explosive conditions since many of the solvents used are flammable.

Hot-melt pressure sensitive adhesives are those adhesives, which upon heating, melt to viscosities suitable for coating, but when cooled are generally in a flowless state. The advantages of hot-melt PSA's relative to solvent-based PSA's are known. Namely, the advantages of hot-melt PSA's are that they (1) do not require removal and containment of solvents, (2) do not require special precautions to avoid fires due to the presence flammable solvents, and (3) make available coating processes other than those commonly used with solvent-based PSA's. In addition, solventless PSA's have the advantage of not containing solvents which sometimes interfere with the addition of other ingredients to the PSA.

Silicone pressure sensitive adhesives have been found to be preferred over other types of PSA's in many applications, especially in the medical area. For example, SPSA's, due to the fact they are acceptable for topical use, have found use in transdermal drug delivery applications which involve the adherence of a drug-containing patch to a patient's skin. It would be highly desirable, therefore, to have a hot-melt SPSA which would have the benefits of being composed of silicone and being a hot-melt PSA.

It is also desirable to have a silicone pressure sensitive adhesive which has controllable adhesion, so that the aggressiveness of adhesion can be tailored to the application. For example, in terms of the transdermal drug delivery patch application, it is desired that the PSA exhibit a suitable adherence to the skin so that it remains adhered for the desired amount of time, but is comfortable to the patient upon removal.

SUMMARY OF THE INVENTION

This invention provides for a hot-melt silicone pressure sensitive adhesive and, therefore, provides the benefits of hot-melt adhesives, and is formed of materials which are acceptable in topical applications. The invention also provides a means of controlling the pressure sensitive adhesive properties of tack, adhesion, and release.

The invention fills the foregoing needs by providing a hot-melt silicone pressure sensitive adhesive composition comprising (i) a silicone resin, (ii) a silicone fluid, and (iii) 1 to 10 weight percent based on the total weight of the silicone resin and the silicone fluid, of at least one ester having the formula:

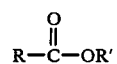

wherein R is a monovalent hydrocarbon radical having from 2 to 32 carbon atoms, and R' is a monovalent hydrocarbon radical having from 1 to 14 carbon atoms. The invention also encompasses the method of making a silicone pressure sensitive adhesive-coated substrate, using such silicone pressure sensitive adhesive compositions, comprising the steps of (A) heating the silicone pressure sensitive adhesive composition to a coatable temperature above 25° C., (B) coating the heated silicone pressure sensitive adhesive composition on the substrate, and (C) cooling the coated silicone pressure sensitive adhesive composition until it is in a generally nonfluid state.

DETAILED DESCRIPTION OF THE PREFERRED EMBODIMENTS OF THE INVENTION

Generally, the composition of the invention is composed of a silicone pressure sensitive adhesive composition which contains at least one ester selected from a certain group of organic esters. The components of the silicone pressure sensitive adhesive composition other than the ester may be selected from various known silicone pressure sensitive adhesive compositions. The typical silicone pressure sensitive adhesive composition includes a volatile organic solvent, scuh as xylene (which is flammable and requires environmental control), or trichlorotrifluoroethane (which requires environmental control) for reducing the viscosity of the composition to a coatable room-temperature viscosity, and, after coating, the organic solvent is removed by evaporation. The silicone pressure sensitive adhesive compositions of this invention do not employ such solvents that are to be removed, but are still capable of reducing to suitable viscosities for coating at elevated temperatures due to the presence of certain organic esters.

A suitable class of pressure sensitive adhesive compositions consists of (i) a trimethylsilyl-endblocked polysilicate resin such as a silicone resin consisting of a benzene-soluble resinous copolymer containing silicon-bonded hydroxyl radicals and consisting essentially of triorganosiloxy units of the formula $R_3SiO_{\frac{1}{2}}$ and tetrafunctionalsiloxy units of the formula $SiO_{4/2}$ in a ratio of about 0.6 to 0.9 triorganosiloxy units for each tetrafunctionalsiloxy unit present in the copolymer and (ii) a silanol-endstopped polydiorganosiloxane fluid, e.g. a polydimethylsiloxane fluid. U.S. Pat. No. 2,736,721 to Dexter, et al. and U.S. Pat. No. 2,814,601, to Currie, et al. are hereby incorporated by reference to teach of such or similar pressure sensitive adhesive compositions.

Another class of suitable pressure sensitive adhesive compositions to use with the ester according to the invention, is that or those similar to that of U.S. Pat. No. 2,857,356, to Goodwin, Jr., which is hereby incorporated by reference. The Goodwin, Jr. patent teaches of silicone pressure sensitive adhesive compositions which consists of a mixture of ingredients comprising (i) a cohydrolysis product of a trialkyl hydrolyzable silane and alkyl silicate, wherein the cohydrolysis product contains a plurality of silicon-bonded hydroxy groups, and (ii) a linear, high viscosity organopolysiloxane fluid containing silicon-bonded hydroxy groups.

The silicone resin (i) and the silicone fluid (ii) may optionally be condensed together such as by the procedure described in Canadian Pat. No. 711,756 to Pail, which patent is hereby incorporated by reference. In such a condensation reaction, the silicone resin (i) and the silicone fluid (ii) are mixed together in the presence of a silanol condensation catalyst, and the silicone resin (i) and the silicone fluid (ii) are condensed, for example, by heating under reflux condition for 1 to 20 hours. Examples of silanol condensation catalysts are primary, secondary, and tertiary amines, carboxylic acids of these amiines and quaternary ammonium salts.

Another class of suitable pressure sensitive adhesive compositions to use with the ester according to the invention are those compositions described in U.S. Pat. Nos. 4,591,622 and 4,584,355 to Blizzard, et al., U.S. Pat. No. 4,585,836 to Homan, et al., and U.S. Pat. No. 4,655,767 to Woodard, et al., which patents are hereby incorporated by reference. Generally, these pressure sensitive adhesive compositions consist of a blend of a (i) a silicone resin and (ii) a silicone fluid which are chemically treated so as to reduce the silicon-bonded hydroxyl content of the blend. These compositions may optionally be condensed as described immediately above prior to the chemical treatment.

The silicone pressure sensitive adhesive compositions of the invention are prepared by merely mixing siloxanes (i) and (ii) with the selected ester or esters. The silicone pressure sensitive adhesive compositions are then heated to a coatable viscosity and coated on the substrate. Optionally, the coated compositions may be cured. When the composition is to be cured, the composition may further contain a curing catalyst. It is preferred that such catalysts remain inactive at room temperature and temperatures reached during the hot-melt coating process. Therefore, such catalysts that either become active at temperatures higher than that of the hot-melting temperatures or become active upon exposure to another energy source, e.g. UV light or electron beam radiation, are suitable.

Optionally, the silicone pressure sensitive adhesive compositions of the invention may include fillers, such as extending or reinforcing fillers.

The ester used in the invention has the general formula:

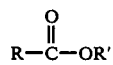

wherein R is a monovalent hydrocarbon radical having from 2 to 32 carbon atoms, and R' is a monovalent hydrocarbon radical having from 1 to 14 carbon atoms. Preferably, R has from 10 to 19 carbon atoms and R' has from 1 to 3 carbon atoms. R and R' are selected independently, so that they may be the same or different. Many of these esters are suitable for topical (on animal skin) applications, such as in the case of transdermal drug applications.

Preferably, the esters for the hot-melt silicone pressure sensitive adhesive compositions of the invention are not flammable which affords a safer procedure during application of the silicone pressure sensitive adhesive compositions at elevated temperatures. Flammable materials, as the term is used herein, are those materials which are flammable according to the definition provided in United States Code of Federal Regulations, Title 49, Part 173, Section 115 (49 CFR 173.115) Briefly restated, a flammable liquid means any liquid having a flash point below 100° F., where flash point means the minimum temperature at which a liquid gives off vapor within a test vessel in sufficient concentration to form an ignitable mixture with air near the surface of the liquid. The CFR provides proper testing conditions for measuring flash point. If flammable esters are used, the coating operation could be done in an inert atmosphere (e.g. nitrogen gas), devoid of oxygen gas to avoid fire hazards.

The ester employed must not boil at the processing temperatures. Typically, temperatures above about 100° C. produce suitable working viscosities with the compositions of this invention, therefore, esters having boiling points above 100° C. are preferred. The esters may be solid or liquid. Even though solid esters may be used, they must be at least somewhat soluble in the silicone pressure sensitive adhesive at the coating temperature.

Examples of suitable esters include 1-phenylethylpropionate, linolec acid ethyl ester, dodecyl acetate, ethyl triacontanoate, octyl acetate, methyl caproate, methyl decanoate, isobutyl acetate, methyl docosanoate, methyl heptadeconate, isopropylpalmitate, isopropylmyristate, and lauric acid methyl ester, and mixtures thereof.

The esters may be employed in amounts of about 1 to 10 weight percent based on the total weight of the silicone resin and the silicone fluid. Generally, if the ester is a fluid at room temperature, especially when the PSA is not to be cured, it is preferred that the maximum limit of the ester be about 7 percent, because at higher amounts, the ester may make the hot-melt silicone pressure sensitive adhesive too flowable at room temperature which is undesirable for most PSA applications. Usually, the solid esters are preferred when it is desired to use greater than about 7 weight % ester in the composition.

The silicone pressure sensitive adhesive compositions of this invention may be made by mixing the ingredients in any order. Reaction or treatment of the ingredients, e.g. condensing according to the procedure of the previously-mentioned Pail patent or chemically treating according to the previously-mentioned Blizzard, et al., etc. patents may require completion prior to the addition of the ester.

The ester allows the silicone pressure sensitive adhesive composition to decrease in viscosity with elevated temperatures to a suitable viscosity for coating a substrate without the use of solvents that must be removed. Suitable viscosities for hot-melting processing are about 20,000–30,000 cp, and more typically 30,000–40,000 cp. Typically, heating the hot-melt silicone pressure sensitive adhesives of this invention to temperatures of about 100° C. or more (more typically above 150° C.) result in suitable viscosities less than 40,000 cp. These coatable temperatures are low enough so that decomposition of the composition does not occur. Lower temperatures may result in coatable viscosities depending on the coating equipment used, the desired end product, and the type and amount of ester used. For example, the thicker the layer of pressure sensitive adhesive desired, the higher the coating viscosty can be.

When the pressure sensitive adhesive compositions are applied to a backing or substrate, this procedure may be accomplished by using any conventional means such as roller coating, dip coating, extrusion, knife coating, or spray coating.

The silicone pressure sensitive adhesives of the invention will adhere to many substrates, such as paper, cloth, glass cloth, silicone rubber, polyethylene, polyethylene terephthalate, polytetrafluoroethylene, glass, wood, metals, and skin. Therefore, there are many uses for the silicone pressure sensitive adhesives of this invention. Depending on the desired use, it may be desirable to apply adhesion promoters on the substrate surface upon which the the hot-melt silicone pressure sensitive adhesive will be placed.

In addition, the silicone pressure sensitive adhesives of this invention have the potential advantage, when used in transdermal drug delivery applications, to provide additional benefits in terms of providing an improved control of permeation rates of the drug through the skin and skin softening due to the presence of the ester.

The following are examples of the invention and are meant to be illustrative only and should not be construed as limiting the invention which is properly delineated in the appended claims. In the following examples, all parts and percentages are by weight unless otherwise specified. "N.V.C." (Nonvolatile Content) of a resin, as given below, was determined by mixing 1.5 g of the resin with 0.75 g. of a 100 cSt. viscosity trimethylsiloxy-endblocked polydimethylsiloxane (PDMS) fluid in an aluminum foil dish, 60 mm in diameter and 15 mm deep, and heating the sample for 2 hours at 150° C. in an air-circulating oven. The heated sample was then cooled to room temperature and reweighed to determine the weight of the nonvolatile material (w). The N.V.C., in percent, is equal to 100*w/1.5.

For the following examples, Resin A-1 is a xylene solution of a resinous copolymeric siloxane prepared from 45 parts of sodium silicate (41.6° Be) and 20 parts of Me$_3$SiCl according to the method of U.S. Pat. No. 2,676,182 to Daudt, et al. containing Me$_3$SiO$_{\frac{1}{2}}$ units and SiO$_{4/2}$ units in a ratio of approximately 0.75:1.0, and having a N.V.C. typically about 69–71%, an acid number in the range of 0.3 to 1.4, and a viscosity in the range of 10–14 centipoise at 25° C. at 60% N.V.C. in xylene solution, and a silicon-bonded hydroxyl content of about 2.5 weight percent based on a 100% N.V.C.

Resin A-2 is devolatilized Resin A-1 (100% nonvolatile content).

PDMS Fluid A is a homogeneous mixture of hydroxyl-endblocked polydimethylsiloxane having a number average molecular weight of approximately 40,000 and minor amounts of cyclic polydimethylsiloxane having degrees of polymerization between 4 and 30, the mixture having a viscosity between 12,000 and 15,000 cp as measured using a Brookfield Viscometer Model HAF with spindle #3 at 10 RPM's.

PSA Composition A was prepared by homogeneously mixing 24.1 parts by weight of Resin A-2, 39.8 parts by weight xylene, and 36.1 parts by weight PDMS Fluid A. The mixture was then heated to 100° C. and anhydrous ammonia was passed through the mixture at a rate of 11 ml/min/lb of non-volatile component of the mixture for 2 hours. To endcap the mixture, hexamethyldisilazane was then admixed at a 3:1 mole ratio of endblocking triorganosilyl to total silicon-bonded hydroxyl radicals peesent in the resin copolymer and polydiorganosiloxane, and the mixture was allowed to react for 3 hours at 95°–100° C. The mixture was then heated to 140° C. and maintained at 140° C. under reflux conditions for 3 hours to remove condensation water. The mixture was then stripped to greater than 90% nonvolatile content.

EXAMPLES 1–11

In Examples 1–11, hot-melt silicone pressure sensitive adhesive compositions were prepared by mixing 95 parts PSA Composition A with 5 parts of the designated ester at 100° C. until homogeneously mixed and then allowing the mixture to cool to room temperature. The selected ester, its boiling point (BP) in °C. at 760 mm Hg. (unless stated otherwise), or melting point (MP) in °C., and flash point (FP) in °F., when available, for each Example are given in Table 1. The esters were obtained from Aldrich Chemical Co., Inc., Milwaukee, Wis. The plasticity of the hot-melt silicone pressure sensitive adhesive was measured at room temperature and after force was applied on a sample weighing twice the adhesive's specific gravity for 3 minutes±5 seconds using ASTM D926. Dynamic viscosities were measured in poise using the Visco-Elastic Tester available from Rheometrics, Piscataway, NJ, and running a frequency sweep from 0.1 to 100 rad/sec at a 10% strain using 25 mm parallel plates and a 1 mm sample size. The plasticities and viscosities are given in Table 2. For comparative purposes, the plasticity and viscosities of PSA Composition A are given in Table 2 for Example 12.

Tapes were prepared from the hot-melt silicone pressure sensitive adhesive compositions of these examples to measure adhesion and release values. In order to get accurate, reproducible measurements of release and adhesion, the compositions were dispersed 50% in LACOLENE ®, a water white industrial aliphatic solvent having a distillation range of 196°–267° F. available from the Exxon Company, Houston, TX, and casted onto one-inch wide strips of SCOTCH-PAK ®1022 Release Liner, a polyester film coated with a release coating available from the 3M Company, St. Paul, Minn., to a 2 mil thickness. After evaporation of the LACOLENE ®, a one-inch wide strip of MYLAR ® polyester film was adhered to each casted sample with a 4 lb. roller.

The release values were obtained by stripping the tape from the SCOTCH-PAK ®1022 Release Liner at a rate of 40 inches/minutes at an angle of 180° while attached to a tensile testing machine, with the results being expressed in grams per centimeter. An average value over the entire length of the liner is recorded.

The tapes (2 mil thick pressure sensitive adhesive on MYLAR ®) were then each adhered to a stainless steel panel with a 4 lb. roller and allowed to rest for 15 minutes. The adhesion measurements were obtained by stripping each tape from the panel at a rate of 12 inches/minute at an angle of 180° while attached to a tensile testing machine, and the results are expressed in grams per centimeter.

All of the compositions were tacky to the touch. The adhesion and release values are given in Table 3 and are reported with standard deviations. For comparative purposes, the adhesion and release values of PSA Composition A are given in Table 3 for Example 12.

TABLE 1

| Ex. | Ester | MP | BP | FP |
|---|---|---|---|---|
| 1 | 1-phenylethyl-propionate | | 91–92/ 5 mm Hg | 202 |
| 2 | linolec acid | | | >230 |

TABLE 1-continued

| Ex. | Ester | MP | BP | FP |
|---|---|---|---|---|
| 3 | ethyl ester dodecyl acetate | | 150/ 15 mm Hg | >230 |
| 4 | ethyl tricontanoate | 67-69 | | |
| 5 | octyl acetate | | 211 | 187 |
| 6 | methyl caproate | | 151 | 113 |
| 7 | methyl decanoate | | 108/ 10 mm Hg | |
| 8 | isobutyl acetate | | 115-117 | 71 |
| 9 | methyl docosanoate | 54-56 | | >230 |
| 10 | methyl heptadeconate | 31-32 | | >230 |
| 11 | isopropyl-palmitate | | ~198 | >230 |

TABLE 2

| Ex. # | Plasticity (mils) | Dynamic Viscosity (poise) | | |
|---|---|---|---|---|
| | | 25° C. | 100° C. | 200° C. |
| 1 | 35 | 17,300 | 1,985 | 217 |
| 2 | 38 | 15,900 | 1,257 | 187 |
| 3 | 26 | 9,200 | 1,278 | 213 |
| 4 | 25 | — | 1,410 | 189 |
| 5 | 26 | 1,600 | 1,806 | 251 |
| 6 | 38 | 21,600 | 3,113 | 207 |
| 7 | 26 | 2,400 | 465 | 150 |
| 8 | 34 | 32,400 | 2,437 | 165 |
| 9 | 9 | 119,900 | 891 | 189 |
| 10 | 28 | 3,900 | 564 | 133 |
| 11 | 30 | 7,200 | 740 | 165 |
| 12 | 132 | 330,000 | 14,000 | 500 |

TABLE 3

| Ex. # | Release (g/cm) | Adhesion (g/cm) |
|---|---|---|
| 1 | 0.70 +/− 33.7 | 716.9 +/− 33.7 |
| 2 | 12.42 +/− 3.66 | 23.7 |
| 3 | 19.57 +/− 0.21 | 468.1 +/− 18.2 |
| 4 | 0.59 +/− 0.20 | 412.7 +/− 43.9 |
| 5 | 3.98 +/− 0.20 | 540.4 +/− 40.8 |
| 6 | 4.80 +/− 0.41 | 532.1 +/− 7.8 |
| 7 | 4.22 +/− 0.35 | 616.8 +/− 13.4 |
| 8 | 5.16 +/− 0.20 | 372.0 +/− 45.7 |
| 9 | 17.93 +/− 0.70 | 24.0 +/− 1.1 |
| 10 | 10.78 +/− 3.76 | 838.7 +/− 21.4 |
| 11 | 10.08 +/− 2.49 | 251.1 +/− 36.1 |
| 12 | 1.4 | 652 +/− 19.6 |

EXAMPLE 13

A homogeneous mixture of 3% isopropylpalmitate and 97% PSA Composition A was prepared. The mixture was heated to 200° C. and placed between the release-coated surface of one sheet of SCOTCH-PAK ®1022 Release Liner and the polyester surface of another sheet of SCOTCH-PAK ®1022 Release Liner. The mixture was casted by pulling the two sheets having the mixture between them through a two-roll coater by hand so that the final thickness of the casted mixture between the two sheets was about 10 mils thick. The casted mixture was cooled to room temperature, and the sheet of SCOTCH-PAK ®1022 Release Liner with the release coated side facing the mixture was pulled away from the casted mixture layer. There was no evidence of transfer of the casted mixture onto the release liner. The cooled casted mixture was very tacky to the touch.

EXAMPLE 14

A homogeneous mixture consisting of 10% methyl docosanoate and 90% PSA Composition A was prepared. At temperatures of 100° and 200° C., by observation, the viscosities were suitable for hot melting processing. Upon cooling to room temperature, the mixture was tacky to the touch and was suitable to be a peessure sensitive adhesive.

These and other variations of the present invention may be made which fall within the scope of the appended claims even though such variations were not specifically discussed above.

That which is claimed is:

1. A method of making a silicone pressure sensitive adhesive-coated substrate comprising the steps of:
   (A) heating, to a coatable temperature above 25° C., a silicone pressure sensitive adhesive composition comprising
   (i) a silicone resin,
   (ii) a silicone fluid, and
   (iii) 1 to 10 weight percent based on the total weight of said silicone resin and said silicone fluid, an ester having the formula:

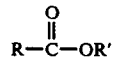

wherein R is a monovalent hydrocarbon radical having from 2 to 32 carbon atoms, and R' is a monovalent hydrocarbon radical having from 1 to 14 carbon atoms,
   (B) coating said heated silicone pressure sensitive adhesive composition on said subsrate, and
   (C) cooling the coated silicone pressure sensitive adhesive composition until it is in a generally non-fluid state.

2. A method as claimed in claim 1 wherein said silicone pressure sensitive adhesive composition is nonflammable.

3. A method as claimed in claim 1 wherein said coatable temperature is above 100° C.

4. A pressure sensitive adhesive-coated substrate prepared by the method as claimed in claim 3.

5. A method as claimed in claim 1 wherein said coatable temperature is above 150° C.

6. A pressure sensitive adhesive-coated substrate prepared by the method as claimed in claim 5.

7. A method as claimed in claim 1 wherein R and R' are each selected from the group consisting of aryl, alkyl, cycloalkyl, hydroxyalkyl, alkenyl, and aralkyl radicals.

8. A pressure sensitive adhesive-coated substrate prepared by the method as claimed in claim 7.

9. A method as claimed in claim 1 wherein R is a monovalent hydrocarbon radical having from 10 to 19 carbon atoms and R' is a monovalent hydrocarbon radical having from 1 to 3 carbon atoms.

10. A pressure sensitive adhesive-coated substrate prepared by the method as claimed in claim 9.

11. A method as claimed in claim 1 wherein said ester is employed from 1 to 7 weight percent based on the total weight of said silicone resin and said silicone fluid.

12. A pressure sensitive adhesive-coated substrate prepared by the method as claimed in claim 11.

13. A method as claimed in claim 1 wherein said ester is selected from the group consisting of 1-phenylethylpropionate, linolec acid ethyl ester, dodecyl acetate, ethyl triacontanoate, octyl acetate, methyl caproate, methyl decanoate, isobutyl acetate, methyl docosanoate, methyl heptadeconate, isopropylpalmitate, isopropylmyristate, lauric acid methyl ester, and mixtures thereof.

14. A pressure sensitive adhesive-coated substrate prepared by the method as claimed in claim 1.

* * * * *